(12) United States Patent
Tredoux et al.

(10) Patent No.: US 7,839,523 B2
(45) Date of Patent: *Nov. 23, 2010

(54) SYSTEM AND METHOD FOR RESOLVING A HARDWARE IDENTIFIER TO A NETWORK ADDRESS OF NETWORKED DEVICE

(75) Inventors: Gavan Leonard Tredoux, Penfield, NY (US); Alan Thomas Coté, Walworth, NY (US)

(73) Assignee: Xerox Corporation, Stamford, CT (US)

( * ) Notice: Subject to any disclaimer, the term of this patent is extended or adjusted under 35 U.S.C. 154(b) by 1160 days.

This patent is subject to a terminal disclaimer.

(21) Appl. No.: 11/301,405

(22) Filed: Dec. 13, 2005

(65) Prior Publication Data

US 2007/0133041 A1     Jun. 14, 2007

(51) Int. Cl.
  *G06F 3/12* (2006.01)
  *G06F 15/177* (2006.01)
  *G01V 3/00* (2006.01)
(52) U.S. Cl. .................. 358/1.15; 358/1.14; 709/229; 709/221; 370/310; 370/392; 340/854.6
(58) Field of Classification Search ............... 358/1.15, 358/1.14; 340/854.6; 709/221, 229
See application file for complete search history.

(56) References Cited

U.S. PATENT DOCUMENTS

| | | | |
|---|---|---|---|
| 6,047,332 A * | 4/2000 | Viswanathan et al. ....... | 709/245 |
| 6,725,264 B1 * | 4/2004 | Christy ....................... | 709/225 |
| 6,769,008 B1 * | 7/2004 | Kumar et al. ............... | 709/201 |
| 6,856,591 B1 | 2/2005 | Ma et al. | |
| 7,190,471 B2 * | 3/2007 | Sandfort et al. ............ | 358/1.14 |
| 7,246,746 B2 * | 7/2007 | McNamara et al. ......... | 235/385 |
| 7,424,004 B2 * | 9/2008 | Hattig ........................ | 370/349 |
| 7,433,957 B2 * | 10/2008 | Miller et al. ................ | 709/229 |
| 7,522,926 B2 * | 4/2009 | Chu et al. ................ | 455/456.1 |
| 7,634,551 B2 * | 12/2009 | Tredoux et al. ............ | 709/220 |
| 7,688,794 B2 * | 3/2010 | Tredoux et al. ............ | 370/338 |
| 2001/0029166 A1 | 10/2001 | Rune et al. | |
| 2002/0089692 A1 * | 7/2002 | Ferlitsch .................... | 358/1.15 |
| 2002/0140985 A1 * | 10/2002 | Hudson .................... | 358/3.23 |
| 2002/0191998 A1 * | 12/2002 | Cremon et al. ............... | 400/76 |
| 2003/0228842 A1 | 12/2003 | Heinonen et al. | |
| 2004/0029592 A1 * | 2/2004 | Shyy et al. .................. | 455/453 |
| 2004/0098506 A1 * | 5/2004 | Jean .......................... | 709/245 |
| 2004/0190042 A1 * | 9/2004 | Ferlitsch et al. ........... | 358/1.15 |

(Continued)

*Primary Examiner*—Twyler L Haskins
*Assistant Examiner*—Dennis Dicker
(74) *Attorney, Agent, or Firm*—Carter, DeLuca, Farrell & Schmidt, LLP

(57) ABSTRACT

A printing system is provided having a plurality of networked printing devices, each printing device of the plurality of printing devices having a communication port for operatively communicating with another printing device of the plurality of printing devices via a network. Each of the printing devices of the plurality of printing devices is assigned a respective network address for use when communicating via the network. A first printing device of the plurality of printing devices includes a first communication device having circuitry for being sensed by a second printing device of the plurality of printing devices independently of the network. The second printing device includes a second communication device having circuitry for sensing the presence of the first communication device of the first printing device independently of the network, and a processor for executing application software for determining the network address of the sensed first printing device via the network.

25 Claims, 3 Drawing Sheets

U.S. PATENT DOCUMENTS

| | | |
|---|---|---|
| 2004/0203846 A1 | 10/2004 | Caronni et al. |
| 2005/0131738 A1 | 6/2005 | Morris |
| 2007/0030824 A1* | 2/2007 | Ribaudo et al. ............. 370/328 |
| 2007/0109117 A1* | 5/2007 | Heitzmann et al. ..... 340/539.12 |
| 2009/0009298 A1* | 1/2009 | Brissman et al. ......... 340/10.51 |

\* cited by examiner

SYSTEM AND METHOD FOR RESOLVING A HARDWARE IDENTIFIER TO A NETWORK ADDRESS OF NETWORKED DEVICE

BACKGROUND

This disclosure relates generally to a system and method for resolving a hardware identifier to a network address of a networked device. More particularly, this disclosure relates generally to a system and method for resolving an RFID identifier to a network address of a networked device.

Networked devices, such as printers or multifunction devices (MFDs), may be configured into clusters, where the devices in a cluster are physically proximal to one another. A user operating a first networked device may request that a second networked device perform a task. When the second device is included in a cluster, a program routine executed by a network server may direct the task or job to another device included in the cluster. The network may select the device to which the task is diverted based on device availability.

However, configuration of a cluster of devices must be performed via the network server. Each time that a device is added to or removed from the cluster, the cluster configuration stored and maintained by the server must be updated. The present disclosure pertains as well to other types of devices that receive a job request from a remote location over a network and generate a physical output, where the generation of the physical output takes time and is subject to failure. The present disclosure is advantageous for providing load-balancing and/or failover. Exemplary applications include devices for burning audio compact discs (CDs), data CDs, DVDs and Photo CDs; programmable laser engraving devices; chemical etching devices; vending machines dispensing the same or similar stock, etc.

Reconfigurations, updates and maintenance to a network server typically are overseen by skilled personnel having the appropriate expertise and network privileges, such as a network administrator. Furthermore, configuration and maintenance of the cluster which is performed by the network server may be disruptive to the network, and may require temporarily disabling the network. In general, the configuration and maintenance of clusters on a network may be time consuming, expensive and disruptive.

Yet, the network administrator has the advantage of deciding which devices should be in a cluster, such as by taking the physical location of the various devices to be clustered into account. For example, when establishing a cluster of printers, it is desirable for the cluster to include printers that are proximal to one another, so that when a print job is redirected from a first printer included in a cluster to a second printer included in the cluster, the user will have a general idea where the location of the printer printing the print job is located. It is desirable for the printed output to be simple to locate and easy to get to, e.g., just a few steps away from the location of the device to which the printing device was sent. Accordingly, it is important to take the physical location of the devices into account when deciding which devices are to be included in a cluster of network devices.

Accordingly, there exists a need for establishing and maintaining a cluster of networked devices without configuring or updating a network server.

Furthermore, there exists a need for establishing and maintaining a cluster of networked devices which takes into account the physical location of the individual devices without configuring or updating a network server.

SUMMARY

Accordingly, it is an aspect of the present disclosure to provide a system and method for automatically forming clusters of networked devices, such as printer devices, without human intervention, where devices included in a cluster are proximal to one another. Proximity of the devices is sensed using a communication technique that is independent from the network, such as Radio Frequency Identification (RFID). Proximity may be approximately in the order of 1 meter or less, and may be determined transitively. The formation of the clusters is spontaneous and dynamic. Once a first device has sensed a second device proximal to the first device, the first device determines the network address of the second device for establishing network communication within the cluster. The network communication may be used for diverting a job from one device of a cluster to another device included in the same cluster.

In accordance with one aspect of the present disclosure, there is provided a printing system including a plurality of printing devices. Each printing device includes an associated radio frequency identification (RFID) device. The RFID device associated with a first printing device of the plurality of printing devices is operable to sense the presence of an RFID device associated with a second printing device of the plurality of printing devices for sensing the presence of the second printing device.

In accordance with another aspect of the present disclosure, there is provided a method for diverting a job request from a first device of a network including at least one device to a second device of the at least one device. In accordance with the method, the first device communicates with a network, interrogates the second device independently of the network, the interrogating having a range limited for interrogating the second device, receives a job request and diverts the received job request via the network to the second device.

Pursuant to still another aspect of the present disclosure, there is provided a processor associated with a device of a plurality of networked devices having a software application module for receiving a job request, and a software application module for diverting the received job request via network transmitted messages to the sensed device, wherein the sensing is independent of the network.

Pursuant to yet another aspect of the present disclosure, there is provided a printing system having a plurality of networked printing devices, each printing device of the plurality of printing devices having a communication port for operatively communicating with another printing device of the plurality of printing devices via a network. Each of the printing devices of the plurality of printing devices is assigned a respective network address for use when communicating via the network. A first printing device of the plurality of printing devices includes a first communication device having circuitry for being sensed by a second printing device of the plurality of printing devices independently of the network. The second printing device includes a second communication device having circuitry for sensing the presence of the first communication device of the first printing device independently of the network, and a processor for executing application software for determining the network address of the sensed first printing device via the network.

In accordance with another aspect of the present disclosure, there is provided a method for communicating via a network between devices of a plurality of networked devices, wherein each device is assigned a respective network address. The method includes a first device of the plurality of devices sensing the presence of another device of the plurality of devices independently of the network, determining via the network the network address of the sensed device, and communicating with the sensed device via the network using the network address.

Pursuant to still another aspect of the present disclosure, there is provided a processor associated with a first device of a plurality of networked devices having a software application module for receiving a hardware identifier associated with a second device of the plurality of networked devices which was retrieved from the second device independently of the network, and a software application module for communicating via the network with the plurality of networked devices for determining a network address for the second device.

BRIEF DESCRIPTION OF THE DRAWINGS

Various embodiments of the present disclosure will be described herein below with reference to the figures wherein.

DETAILED DESCRIPTION

Device Configuration

Figure 1:
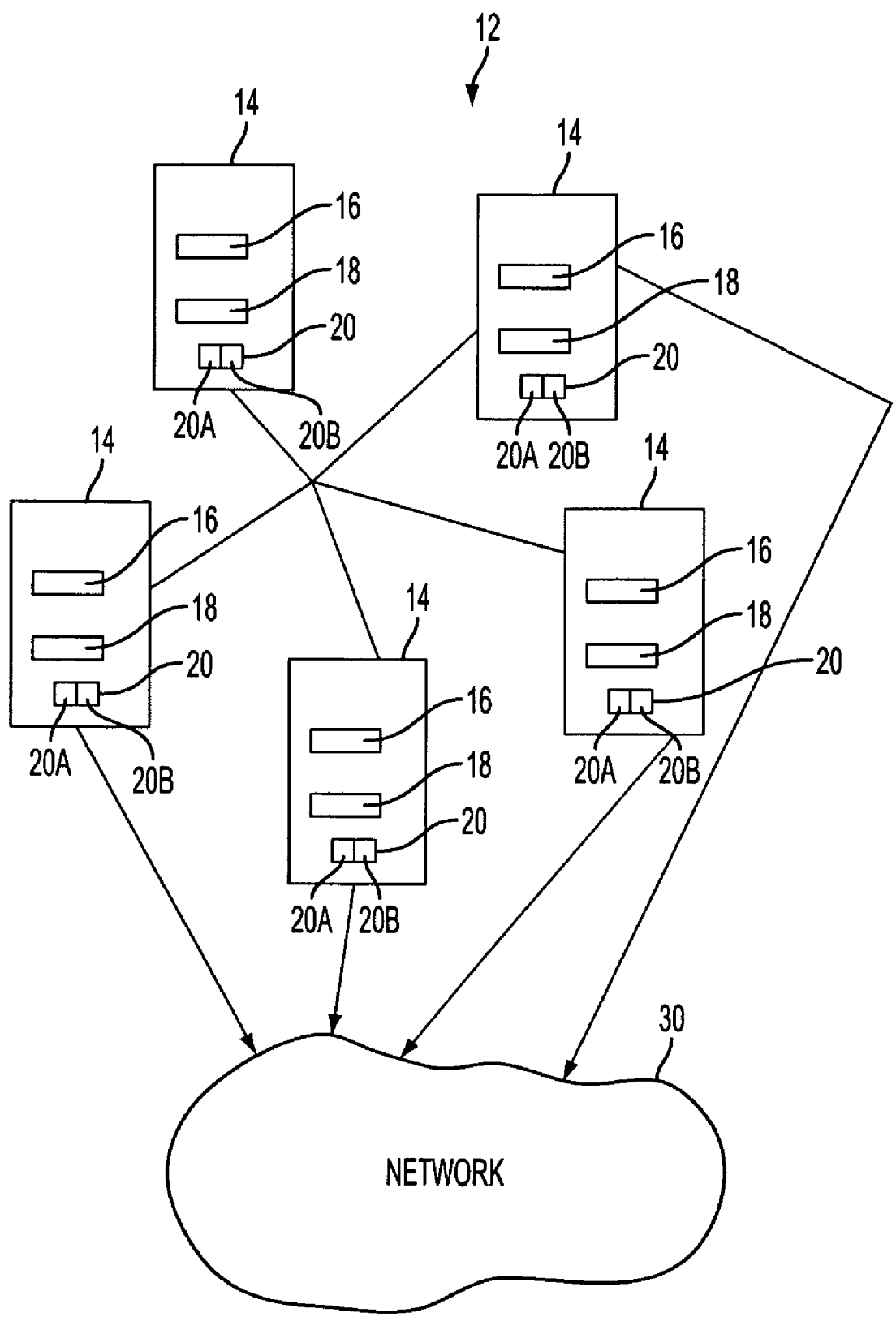
FIG. 1 is a schematic diagram of a cluster of networked devices in accordance with the present disclosure.

For a general understanding of the features of the present disclosure, reference is made to the drawings. In the drawings, like reference numerals have been used throughout to identify identical elements. With reference to FIG. 1, a cluster 12 is shown including individual devices 10 which have been configured to form the cluster 10. Each device 14 is provided with a radio frequency identification (RFID) device 20 including an RFID tag 20A and an RFID reader 20B. Two or more devices 14 having respective RFID devices 20 that are able to successfully interrogate one another are considered to be within operating range of one another. Each of the RFID tags 20A generates a radio frequency signal encoded with a unique RFID identifier. Additionally, the devices 14 are included in a network 30. Each of the devices 14 is provided with a network address for enabling communication with other networked devices via the network 30.

The devices 14 each have a processor 16 (e.g., microprocessor and associated memory), a storage device 17 accessible by the processor 16, and communication I/O circuitry 18 for communicating with other devices via the network 30. In the current example, the devices 14 are printing devices, including any device having printing capabilities, such as a multi-function device (MFD), a scanner, or a facsimile machine, however in the present disclosure the devices 14 are not limited to printing devices. The present disclosure pertains as well to other types of devices that receive a job request from a remote location over a network and generate a physical output, where the generation of the physical output takes time and is subject to failure. The present disclosure is advantageous for providing load-balancing and/or failover. Exemplary applications include devices for burning audio compact discs (CDs), data CDs, DVDs and Photo CDs; programmable laser engraving devices; chemical etching devices; vending machines dispensing the same or similar stock, etc.

The communication I/O circuitry 18 may support wired or wireless communication. The devices 14 may communicate via the network 30 with other devices that are included in the network 30 via the communication I/O circuitry 18. The devices 14 may have the same or different printing and/or computing capabilities relative to one another. The network 30 includes a series of points or nodes interconnected by communication paths, and may be interconnected with other networks and/or contain sub-networks. The network 30 may include, for example, a LAN, WAN, intranet or the Internet. In one embodiment of the disclosure, the network 30 may include, for example, a computer communicating with two or more devices 14, and devices 14 of the two or more devices 14 may not be communicating with one another.

The network 30 and the RFID device 20 are independent and mutually exclusive from one another. The network 30 is used for high bandwidth networking, such as diverting a job request from one device 14 to another device 14, using a protocol, such as TCP/IP, while the RFID device 20 is used for sensing and interrogating another device 14. The only data transmitted via the RFID data communication may be the interrogation data, e.g., the RFID identifier.

The processor 16 includes at least one processing device, such as a microprocessor integrated with the device 14 or a personal computer separate from the device 14 but in operative communication with the device 14. The processor 16 of each device 14 is in operative communication with the network 30, the storage device 17 and the RFID device 20 of the device 14. Operations performed by the processor 16 as described herein are performed by executing application software, which may be grouped into application software modules, including programmable instructions stored by the storage device 17.

Storage device 17 may include one or more storage devices, which may include, for example, a combination of at least one of volatile and non-volatile memory, a hard drive, RAM, Flash RAM, ROM, a computer readable medium, such as a CD-ROM, memory stick or floppy disk, etc. Portions or the entire storage device 17 may be integrated with the processor 16. The storage device 17 may store programmable instructions executed by the processor, including programmable instructions for implementing the method of the disclosure.

The storage device 17, the information stored therein and the processor 16 may be configured upon manufacture and assembly for implementing the present disclosure. In another embodiment of the disclosure, an existing device 14 is reconfigured after manufacture and assembly for implementing the present disclosure. The reconfiguring may include, for example, providing an upgrade module that includes storage device 17 or a portion thereof. The processor 16 may be provided with the already manufactured device 14. The processor 16 executes programmable instructions stored by the storage device 17 of the upgrade module, controls the RFID interrogation and accesses RFID and cluster information stored by the storage device 17. In another embodiment of the disclosure, the upgrade module may include the processor 16, which operatively communicates with a processor provided with the device 14 at the time of manufacture and/or assembly for implementing the present disclosure.

The RFID device 20, may be affixed to the device 14, mounted on the device 14 or integrated into the device 14. The RFID tag 20A and reader 20B of an individual RFID device 20 may be integrated into one unit, or may be configured, manufactured and/or sold as separate units. In the examples below, the RFID tag 20A is a read-only passive tag having an antenna and a digital memory chip storing a unique encoded identification code that is the unique RFID identifier associated with the device 14 to which the RFID tag 20A corresponds. Other types of RFID tags may be used, such as active tags or tags having a write capability. The RFID reader 20B includes an antenna, transceiver, and decoder. RFID devices having different operating ranges are commercially available. An RFID device 20 having a desired operating range is selected to be used with devices 14 in accordance with the distance that is to be allowed between devices 14 included in a cluster.

When a device 14 performs an interrogation, the transceiver of the RFID reader 20B of the device 14 transmits a signal via its antenna which activates any RFID tag 20A within operating range of the transmitting RFID reader 20B. Each activated RFID tag 20A transmits via its antenna the RFID identifier stored in its digital memory chip. A successful interrogation is achieved when the transceiver of the interrogating RFID reader 20B receives the signal transmitted by an activated RFID tag 20A. The interrogating RFID reader 20B decodes the signal(s) received from the activated RFID tag(s) 20A via its decoder, including generating a digital electronic signal which corresponds to the decoded signal. The processor 16 and RFID reader device 20B of the interrogating device 14 are in operative communication, and the processor 16 is notified when an RFID identifier is successfully retrieved. The retrieved RFID identifier may be stored by the storage device 17 of the interrogating device 14.

The physical distance between devices 14 able to form a cluster is limited due to the nature of the RFID devices 20 associated with the respective devices 14. The physical distance limitation is determined by the greatest distance at which a successful RFID interrogation may be performed, including retrieving the RFID identifier stored by the RFID tag 20A of the device 14 being interrogated, which is defined by the respective operating range of the RFID devices 20 of the interrogating device 14 and the interrogated device 14. If the first and second devices 14 are spaced from one another by a distance that is less than or equal to the operating range of their respective associated RFID devices 20, the first and second devices 14 will be able to successfully interrogate one another and form a cluster. However, if the first and second devices 14 are spaced from one another by a distance that is greater than the operating range of their respective associated RFID devices 20, the first and second devices 14 will not be able to successfully interrogate one another, or to form a cluster.

The limitation on the physical distance between devices 14 able to form a cluster works advantageously to only allow devices 14 located in a predetermined area to form a cluster. For example, where the devices 14 are printing devices, the devices 14 may be equipped with RFID devices 20 in which the operating range is limited to approximately 2-3 feet. Accordingly, it is possible to limit an established cluster to include devices 14 located in one room. Printing devices located in a different room, further down the hallway or on a different floor would not be included in the cluster. A user sending a print job to a printing device included in a cluster will be able to collect output from any of the printing devices in the cluster without having to walk far from the printing device to which the job was sent.

Other communication devices may be used instead of the RFID devices 20. For example, communication devices using Bluetooth™ technology, which also have a limited operating range, can be used for communicating between devices 20 independently of the network 30 for the purpose of establishing a cluster. However, devices using Bluetooth™ technology may be more expensive than RFID devices 20, without providing additional capabilities useful for the purposes of establishing a cluster. Other communication devices (e.g., devices using the IEEE 802.11B standard) that operate independently of the network 30 and that do not have a limited operating range could be used. Such communication devices may not be practical for devices 14 such as printing devices, as it would be difficult for a user to locate a printed output. Even if the user were notified as to the location of the output, it may not be practical or desirable for the user to walk beyond a given distance to retrieve a printed output. It is contemplated that the user could be notified as to the location or identification of a device 14 to which a job has been diverted. Notification implemented by the network server is beyond the scope of the present disclosure.

Exchanging signals via the RFID devices 20 is limited to exchanges used for establishing a cluster. The RFID identifiers are used for sensing proximity between devices 14 and for establishing a cluster name, while other communication between devices 14 is performed via the network 30, where each device 14 uses its network address for identifying itself during network communications.

Each cluster is provided with a unique name. The storage device 17 of each device 14 stores cluster information, e.g., the name of the cluster in which the device is included. Before clustering with any other devices 14, by default, each device 14 forms its own default cluster, where the default cluster name of each default cluster is the name of the RFID identifier of the device 14 included in the respective default cluster. The unique RFID identifiers assigned to each of the respective devices 14 are ordered, and the ordering is used for determining what the cluster name will be for a cluster formed of more than one device 14. Accordingly, the cluster names are ordered as well.

The final cluster formation is independent of the order in which devices 14 sense each other, including the order in which additional devices 14 are physically brought within proximity of devices 14 already included in a cluster. In one embodiment, if a device 14 is removed from the cluster, it does not matter if the RFID identifier of the device 14 that is removed was used for the cluster name. The cluster retains the same cluster name, even once the associated device 14 is removed.

Cluster Formation

In general, for each printing device 204, the RFID device 20 is controlled by the processor 16. The RFID reader device 20B polls any devices 14 nearby by sending an interrogation signal at intervals, such as regular timed intervals. The interrogation signal activates one or more RFID tags 20A that are within the operating range of the interrogating RFID reader device 20B, and requests that the activated RFID tag 20A transmit a signal including the RFID identifier stored by the activated RFID tag 20A. An RFID tag 20A that is activated by the interrogation signal and sends its stored RFID identifier to the interrogating RFID reader device 20B is detected by the RFID reader device, and the device 14 having the interrogating RFID reader device 20B detects the device 14 having the interrogated RFID tag 20A.

The RFID identifier retrieved by the RFID reader device 20B is provided to the processor 16 of the detecting device 14. The processor 16 of the detecting device 14 compares the retrieved RFID identifier to a stored list of RFID identifiers that were retrieved via previous interrogations. If the received RFID identifier is on the list, no further action is taken with the received RFID identifier. Otherwise, the retrieved RFID identifier is added to the list. Furthermore, the processor 16 of the detecting device 14 requests the cluster name for the detected device 14 and compares the cluster name received via the request to the stored cluster name of the detecting device 14. The cluster name having the lower value is selected, while the other cluster name is non-selected.

The selected cluster name is the name of the cluster configured to include the detected and the detecting devices 14. One of the detected and the detecting devices 14 replaces its stored cluster name (the non-selected cluster name) with the selected cluster name. When appropriate, the detecting device 14 may send a message via the network 30 to the detected device 14 requesting that the detected device 14 replace its cluster name. Messages transmitted via the network 30 are generated by the processor 16 of the transmitting device 14, and messages received via the network 30 are processed by the processor 16 of the receiving device. At least one message is sent requesting that any device 14 having the non-selected cluster name replace its cluster name with the selected cluster name. The message is sent to other devices on the network 30, such as by way of a broadcast or multicast, and may nullify the need for the detecting device 14 to send a message specifically to the detected device 14.

Figure 2:
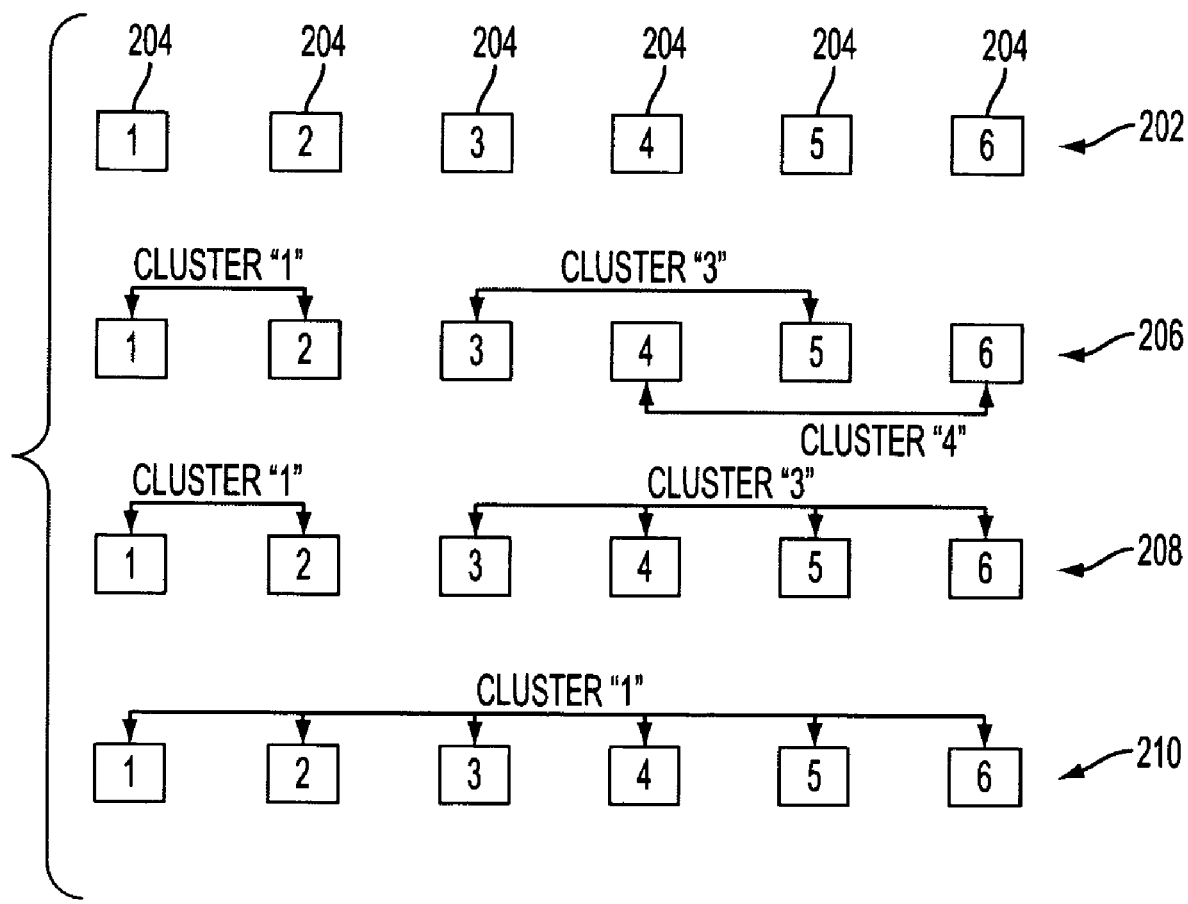
FIG. 2 is a block diagram showing a series of stages of forming a cluster of networked devices in accordance with the present disclosure.

An example of cluster formation is illustrated with reference to FIG. 2. At stage 202, six printing devices 204 are provided having RFID identifiers 1, 2, 3, 4, 5 and 6, respectively. The printing device 204 having RFID identifier (ID) 1 is referred to as the first printing device, the printing device 204 having RFID identifier 2 is referred to as the second printing device, etc. Devices 204 are functionally and structurally substantially the same as devices 14 shown and described with respect to FIG. 1.

The cluster name stored for each of the printing devices 204 is the RFID identifier associated with the respective printing device 204, which is the default value. At stage 206, the respective RFID readers 20B associated with each of the first and second printing devices 204 each detect an adjacent printing device 204 by sensing the RFID tag 20A of the other printing device. The processor 16 of each of the devices 14 is notified that an RFID tag 20A was detected, including providing the processor 16 with the retrieved RFID identifier. The RFID identifier is stored by the associated storage device 17.

The processor 16 compares the retrieved RFID identifier to a list of previously stored RFID identifies for determining if the retrieved RFID identifier was previously detected. If not, the processor 16 submits a request over the network 30 for the cluster name of the device having the detected RFID identifier. The request is sent to other devices 14 of the network 30, such as by way of a multicast or broadcast. Upon receiving the requested cluster name, the processor 16 compares the ordering of the received cluster name (associated with the detected RFID identifier) and its own stored cluster name. The cluster names always originate from an RFID identifier, and therefore have the same type of ordering. The comparison may be performed by performing an ordering operation such as a minimum operation (MIN) or maximum operation (MAX).

In the present example the MIN operation is used to determine the lower ordered value of the cluster names being compared. If the stored cluster name of the detected printing device 204 is lower than the received cluster name (of the printing device that is detecting), then the detecting printing device 204 replaces its stored current cluster name with the cluster name of the lower ordered received cluster name (of the detected printing device 204), thus forming a cluster. Accordingly, the first printing device 204 detects the second printing device, retrieves the RFID identifier associated with the detected printing device, and requests the cluster name of the printing device having the retrieved RFID identifier.

The cluster name received via the request is "2". The first printing device compares its own stored cluster name "1" to the received cluster name "2" (e.g., the cluster name of the detected printing device 204, also referred to as the detected cluster name), determines that its own cluster name is lower, and does not change its own cluster name. This may be performed by performing the operation: MIN (my cluster name, detected cluster name). The second printing device detects the first printing device and compares its own cluster name "2" to the detected cluster name "1", determines that the detected cluster name is higher than its own cluster name, and replaces its currently stored cluster name with the detected cluster name "1". Both the first and second printing devices form a cluster having cluster name "1". Similarly, the third and fifth printing devices 204 detect one another and form a cluster having cluster name "3". Likewise, the fourth and sixth printing devices 204 detect one another and form a cluster having cluster name "4". The clustering of the six printing devices shown for stage 206 is exemplary, and may have occurred in a different order. For the sake of simplicity, a cluster having cluster name "n" is herein referred to as cluster "n".

At stage 208, the clusters combine recursively. When a device 20 in cluster "4" detects a device 20 from the cluster "3", the device 20 from cluster "4" performs the operation MIN(3, 4) and determines that its new cluster name is "3". It issues a broadcast or multicast via the network 30 announcing that it has changed its cluster name from "4" to "3". The other networked devices 20 "4" with the cluster name "3". Accordingly, cluster "3" and cluster "4" combine to form one cluster having cluster name "3". The clustering of the six printing devices shown for stage 208 is exemplary, and may have occurred in a different order.

At stage 210, an amalgamation of clusters is performed, in which cluster "1" combines with cluster "3" to form one cluster having cluster name "1" as follows. When a device 20 in cluster "3" detects a device 20 from the cluster "1", the device 20 from cluster "3" performs the operation MIN(1, 3) and determines that its new cluster name is "1" (i.e., by replacing its current cluster name "3" with "1"). It issues a multicast or broadcast via the network 30 announcing that it has changed its cluster name from "3" to "1". The other networked devices 20 listen to the multicast or broadcast. All devices 20 that are in cluster "3" (i.e., have cluster name "3") update their cluster name to "1" (i.e., by replacing their current cluster name "3" with "1"). Accordingly, cluster "3" and cluster "1" combine to form one cluster having cluster name "1". The clustering of the six printing devices shown for stage 210 is exemplary, and may have occurred in a different order.

Resolution between the RFID identifier of device 14 and its network address is accomplished via a network broadcast, multicast or the equivalent, inquiring which network address is correlated with a particular cluster name. A system and method for resolving RFID identifiers with network addresses is described below in the section entitled "ADDRESS RESOLVING", however the disclosure is not limited to the described system and method for RFID identifier and network address resolution A first device may perform a compatibility check prior to forming a cluster with a second device 14, such as for determining if the first and second devices have capabilities that are compatible with each other. For example, when the first device 14 has one or more particular features for handling jobs, the first device 14 may first determine if the second device 14 has the same particular features. It is envisioned that various features of printing devices 14 may be coded using a predetermined and/or standardized code. A coded list of features associated with each device 14 may be available to other devices 14 on the network 30 via the network 30. When the first device 14 interrogates a second device 14, it may first check the second device's 14 associated list of features before establishing a cluster with the second device 14. If the first device 14 determines that the second device 14 is sufficiently compatible with the first device 14, the first device 14 will proceed with forming a cluster with the second device 14. However, if the first device 14 determines that the second device 14 is not sufficiently compatible, the first device 14 will not form the cluster with the second device 14.

In one embodiment of the disclosure, the storage device 17 of a device 14 (in which the cluster name of a cluster to which the device 14 belongs is stored) includes volatile memory for storing the cluster information. If a first device 14 is powered down, the first device 14 loses its cluster information. Upon restoration of power to the device 14, it will establish a cluster with one or more suitable devices, e.g., device(s) which are located within operating range of the first device 14 and which are determined to be compatible (for cases in which compatibility determination is performed). Thus, upon restoring power to one or more devices 14 of the cluster, the original cluster will be reestablished with the same configuration as before power was removed without any external intervention, provided that all of the devices 14 of the original cluster are receiving power and are still within operating range of one another for performing successful RFID interrogations. The cluster configuration will change if one or more devices 14 have been moved out of or into operating range from other devices 14 included in the cluster. The cluster formation occurs automatically without any intervention from an operator. The configuration of the newly established cluster is predictable, provided that the distance between devices 14 is known and the operating range for the respective devices 14 is known.

In another embodiment of the application, the devices 14 store the cluster information in nonvolatile memory. Accordingly, when restoring power to a device 14 that belonged to a cluster and was powered down, cluster information stored by the device 14 would have to be updated if the physical configuration of the cluster changed (e.g., by adding or removing the device 14 or another device 14 to or from the cluster). The updating of stored cluster information could be performed by an operator or administrator. Alternatively, the stored cluster information could be overwritten with new cluster information obtained from new RFID interrogations performed after power was restored.

Upon establishment of a cluster, devices 14 included in the cluster operate in accordance with a peer-to-peer configuration. Each of the devices 14 included in the cluster operates as a true peer, where a true peer does not administer or control the other devices 14 in the cluster e.g., for cluster configuration or job diversion. The cluster does not have an administrator, a controlling member, super-peer, server or the equivalent. The formation or existence of the cluster is not dependent upon the network server. The cluster uses the network for purposes of communication, such as for diverting job requests, but does not use the network for cluster formation. There is no need at any stage for centralized administration within or outside of the cluster for establishment of the cluster and for operation of the cluster.

Additionally, there is no single point of failure within the cluster. If a device 14 fails, a job sent to the failed device 14 is diverted to another device 14 in the same cluster as the failed device 14. For example, jobs sent to a first device 14 included in the cluster may be redirected to a second device 14 included in the same cluster upon a determination by the first device 14 that the second device (or any device included in the cluster) is in better (or equal) condition than the first printer to handle the job. Some exemplary conditions in which diversion of a print job from the first printer to the second printer may be performed include: when the first device 14 is temporarily disabled, the print job was attempted by the first printer but failed, an error conditions exists on the first printer (e.g., out of paper or toner), the first printer has a queue of jobs, the time expected till execution of a job received by the first printer exceeds a predetermined threshold, or a comparison of queue length for the first printer and the second printer indicates that the second printer has a smaller queue or no queue at all.

The RFID reader device 20B of each device 14 may repeatedly perform interrogations for seeking additional devices 14 that are not yet included in its cluster, where the interrogations may be performed spontaneously, upon meeting a predetermined condition, or continuously at regular intervals (interrogation intervals). In the present example, the RFID reader device 20B of a device 14 continuously transmits an interrogation signal at regular intervals. Any RFID tag 20A within operating range of the RFID reader device 20A is activated by the interrogation signal and responds to it. The RFID reader device 20B retrieves the RFID identifier stored by the RFID tag 20A being interrogated.

The processor 16 of the device 14 having the associated interrogating RFID reader device 20B receives the retrieved RFID identifier and determines if the interrogated RFID tag 20A was previously interrogated, and if so, ignores the RFID tag 20A and the device 14 with which it is associated. Otherwise, an attempt is made to request the cluster name of the interrogated device 14 having the RFID identifier retrieved during the interrogation in order to configure a cluster to include the interrogating device 14 having the interrogating RFID reader device 20B and the interrogated device 14. If the attempt to retrieve the cluster name is not successful it may be repeated. If the number of attempts to obtain the cluster name or the time consumed attempting to obtain the cluster name exceeds a predetermined threshold, then the cluster configuration may be terminated.

After a finite number of interrogation iterations proximal (and compatible, where compatibility checking is performed) devices 14 are placed in appropriate cluster(s). Two or more devices 14 may interrogate each other, which will not affect the final cluster configuration. First mini-clusters may be formed, which are then joined together to make a larger cluster—also referred to as an amalgamation procedure. The order in which each mini cluster or amalgamation of mini-clusters occurs is not consequential. Race conditions may be ignored. The final configuration of the cluster is predictable.

The formation of clusters of devices 14 is initiated by the devices 14 themselves, and requires no administrative intervention or setup. Installation and administrative costs are thus minimized. The cluster formation occurs dynamically in reaction to physical device deployment. Clusters are reconfigured whenever a device 14 is moved into or out of operating range of another device(s) 14. For example, when a cluster of one or more devices 14 is already formed, upon deployment of another device 14 within operating range of one or more of the devices 14 already in the cluster, at least one of the newly deployed device 14 or a device 14 of the existing cluster will spontaneously interrogate the other device 14 (or vice versa) and determine the cluster name to be used for a cluster that includes the newly deployed device 14. All of the devices 14 in the existing cluster as well as the newly deployed device 14 will be joined in one cluster, without any intervention from an operator or administrator. In another example, when a device 14 is removed from the cluster, the removed device no longer participates in the cluster. The cluster reconfiguration is spontaneous, none of the devices 14 of the cluster acts as a master or controlling node, no prior administrative intervention is performed, and there is no single point of failure. There is no list or table of cluster members that needs to be reconfigured or updated. Due to the peer-to-peer configuration, the cluster will continue working if one or more devices 14 of the cluster fail, provided that all of the devices 14 to not fail.

Further advantages to the present disclosure include invisibility of the clustering operations to network clients of the devices 14, for as far as the clients are aware, the devices 14 fulfill their jobs in a normal fashion. Many redirections may be performed within a cluster at any one time, with each device 14 of the cluster appearing to the client and job request as a normal stand-alone device 14.

Once devices 14 have been assigned cluster names, broadcast communication or multi-cast communication using a multicast address may be used to manage job allocation and other device functions, such as printing functions. Each device 14 receives jobs from external entities and uses peer-to-peer techniques for handling situations such as failover and load balancing of jobs received from external sources.

In another embodiment of the disclosure, the RFID reader device 20B of a device 14 may be controlled by the processor 16 of the device 14. The processor 16 may control the RFID reader device 20B to perform an interrogation in response to an event, such as receipt of a job request or a failed attempt at completing a job request. In another embodiment of the disclosure, the RFID reader device 20B may be automatically disabled by the processor 16 upon configuration of a cluster.

Address Resolving

The above discussion describes the configuration of the devices 14 and formation of a cluster of devices 14, which is also described in concurrently filed U.S. patent application Ser. No. 11/301,429, entitled "SYSTEM AND METHOD FOR DIVERTING A PROXIMAL PRINTING JOB TO A PROXIMAL NETWORKED DEVICE". Below is described a system and method for resolving the RFID identifier of a device 14 with the network address of the device 14. While the example in the description below is directed to devices 14 having RFID devices 20, the RFID devices 20 represent other sensing and/or communicating devices, as well, that communicate and/or sense independently from the network 30. As described above, the devices 14 may be printing devices, or other types of networked devices. The RFID identifier is an exemplary hardware identifier associated with and stored by the sensing and/or communicating device. The description pertaining to the RFID identifier may pertain, as well, to a hardware identifier stored by another type of hardware device, e.g., a communication device, such as a device employing Bluetooth™ technology.

As described above, the RFID tag 20A of the RFID device 20 associated with each device 14 stores an RFID identifier associated with the device 14. Resolution of an RFID identifier and network address associated with a device 14 is now described. Configurations of network 30 may change over time, such as when networked equipment or equipment used for establishing the network is moved, or the network setup is altered. There is not a fixed relationship between the network address of a device 14 and the RFID identifier associated with the device 14. Since it may be inconvenient, impractical and/or difficult to replace the RFID tag 20A of a device 14 with a different RFID tag 20A storing an RFID identifier, and writable RFID tags are expensive, in accordance with an embodiment of the present disclosure, the RFID identifier is fixed, and RFID tags 20A having hard-coded, non-alterable RFID identifiers are used. Accordingly, in accordance with this embodiment of the disclosure, the RFID device 20 does not store network setup information.

Each device 14 knows its own RFID identifier. For example, for each of the devices 14, the storage device 17, which is accessible by the processor 16, stores the same RFID identifier that is stored by its RFID tag 20A. The RFID identifier is entered into a non-volatile portion of the storage device 17 for storage thereof, for example at a stage of manufacturing, assembly or configuration of the device 14 with the RFID device 20.

Figure 3:
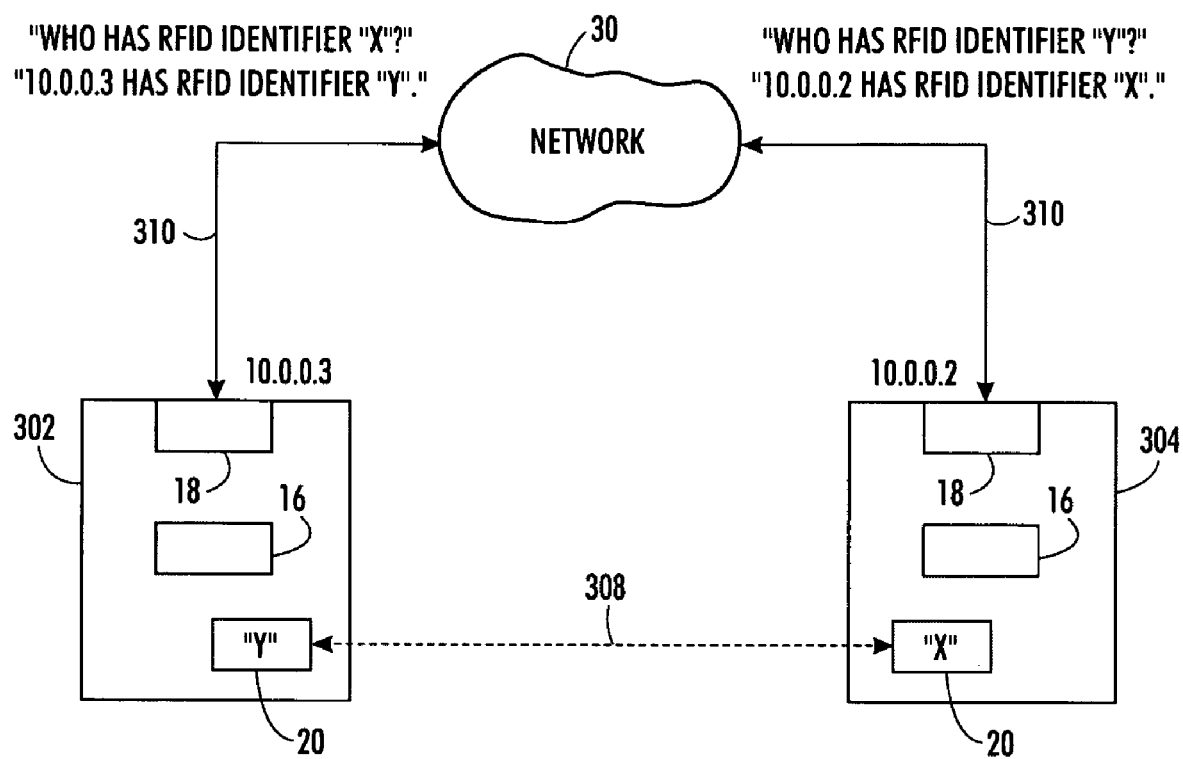
FIG. 3 is a block diagram showing devices performing address resolution in accordance with the present disclosure.

With reference to FIG. 3, the process is described for resolving the network address and RFID address of an exemplary first and second networked device 302 and 304, respectively, such as when the devices 302 and 304 establish a cluster. Devices 302 and 304 are functionally and structurally substantially the same as devices 14 shown and described with respect to FIG. 1. Each of devices 302 and 304 are assigned a network address, 10.0.0.3 and 10.0.0.2, respectively. Furthermore, each of devices 302 and 304 includes an RFID device 20, including an RFID reader device 20B and an RFID tag 20A storing a respective RFID identifier. The RFID identifier stored by the RFID tag 20A of device 302 is "y", and the RFID tag 20A of device 304 is "x".

Additional devices may be included in the network and assigned respective network addresses. Any networked device of the networked devices may sense another networked device and determine the network address for the sensed device, which includes resolving a hardware address of the sensed device that is used for the sensing with the network address of the sensed device. Once the address resolution is performed, the sensing device may communicate with the sensed device via the network 30 using the resolved network address. Accordingly, there is no need to use the communication medium that was used for the sensing for anything but the sensing.

First, device 302 senses the presence of device 304, including the RFID reader device 20B of device 302 sensing the presence of the RFID tag 20A of device 304 and retrieving the RFID identifier "x" stored by the sensed RFID tag 20A. The interrogation (denoted by dotted line 308) is performed independently of the network 30, and is performed using RFID technology. In another example, a different technology may be used for sensing the presence of device 304 by device 302. The processor 16 of device 302 is aware of the sensing of the presence of device 304 and generates a query message, "Who has RFID identifier "x"?", which is transmitted via communication port 18, e.g., by issuing a multicast or broadcast, where the multicast or broadcast is a message transmission directed to all addresses on the network 30 or a segment of the addresses on the network 30 (a sub-network). All of the devices included on the network to which the query message was multicast, broadcast or transmitted receive the query message. The processor 16 of the respective devices receiving the query message determines whether or not their RFID identifier is "x" by comparing the RFID identifier "x" included in the query message with the RFID identifier stored by storage device 17. Devices receiving the query message that do not have an RFID identifier "x" ignore the query message. The processor 16 of the device which does have the RFID identifier "x" (device 304 in the current example) generates a reply message including the network address of the device 304, 10.0.0.2 in reply to the query message. The reply message is transmitted to the device 302 via the network 30. An exemplary reply message is "10.0.0.2 has RFID identifier "x"".

If device 302 receives no reply to its query message, then it may repeat transmitting the query message, such as until it receives a reply, or a time threshold or number of attempts threshold is exceeded. The threshold(s) may be configurable. If device 302 receives a reply message with the requested network address, it may communicate with device 304 via the network 30 using network communication methods and the network address obtained in the reply message. Otherwise, device 302 may ignore the RFID identifier "x" received via the interrogation. In a similar fashion, device 304 may interrogate device 302 and transmit, multicast or broadcast a query message "Who has RFID identifier "y"?". Device 302 replies with the reply message, "10.0.0.3 has RFID identifier "y"". The query and reply network communication is denoted by arrows 310. The network communication 310 and the RFID communication 308 are mutually exclusive of one another.

One application for resolving network addresses and RFID identifiers in accordance with the method described above is for establishment of a cluster of one or more devices 14. A device 14 using multicasts or broadcasts for transmitting queries and replies may establish a cluster with other devices 14, including resolving network addresses and RFID identifiers which are capable of receiving its transmitted multicasts or broadcasts. A multicast or broadcast range (e.g., set of devices capable of reception of the multicast or broadcast messages) is established by local routing policies. Often, devices 14 within multicast or broadcast range of one another must have addresses which are included in a set of addresses connected to a single local network hub (e.g., which forms a sub-network or network segment). The local network hubs are often set up by default to conform to a policy established for preventing network broadcast storms. Devices having addresses included in the set are typically located physically proximate to one another. Since it is desirable, in accordance with the present disclosure, to form clusters with physically proximate devices cluster, it is highly likely that devices to be clustered are all included on the same network segment.

An advantage to the described method for resolving the RFID identifier and network address of a device 14 is that administrative intervention is not required, and directories mapping network addresses to RFID identifiers do not have to be created or maintained. Accordingly, significant gains in ease-of-use and reduction in setup and maintenance costs can be achieved.

The above described method for resolving the RFID identifiers (or hardware identifiers) with network addresses should not be confused with prior art Address Resolution Protocol (ARP) and related protocols for resolving network addresses (e.g., IP addresses) to network hardware addresses (e.g., Ethernet MAC addresses), or back again. In ARP, both addresses being resolved are networking addresses having different protocol levels. The present disclosure provides a method for mapping an RFID identifier to a network address, where the RFID identifier plays no function in the network communication, since the RFID identifier is not an address of any hardware entity used for that network communication, as the RFID communication and network communication are independent of one another and mutually exclusive.

In one embodiment of the present disclosure, the RFID device 20 of a first device 14 may include an RFID reader device 20B (or other type of reader device using another technology for communicating independently from the network 30), but may not include an RFID tag 20A or RFID identifier. The RFID device 20 of a second device 14 may include an RFID tag 20A storing an RFID identifier (or other means storing an identifier that is readable by the reading device of the first device 14), but may not include an RFID reader device 20B. The first device 14 may interrogate the second device 14, determine the network address for the second device 14, and communicate with the second device 14 via the network using the determined network address.

There are many other possible applications for resolving network addresses and RFID identifiers, such as for taking inventory, security, etc. In a first example, a clerk may operate a handheld inventory taking device that is operatively connected to the network 30 and includes an RFID reader device 20B. When sensing an RFID tag associated with an object being inventoried (including retrieving the RFID identifier stored by the RFID tag being sensed), the handheld device resolves the RFID identifier associated with the object and a network address of the object. The handheld device may then interrogate the object for further asset management data using the network 30, rather than using the limited storage and communication capability of the RFID devices 20.

In another example of an application for resolving network addresses and RFID identifiers, a secured area may allow only authorized vehicles to enter a gate. The gate may be equipped with a security device having an RFID reader device 20B which senses the RFID tag associated with an approaching vehicle. The security device resolves the RFID identifier retrieved from the sensed RFID tag associated with the vehicle with the network address of the vehicle. The security device may further interrogate the vehicle for additional security related data before deciding whether or not to open the gate for the vehicle.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments in hardware, software, or a combination thereof. The word "printer" as used herein encompasses any apparatus, such as a digital copier, bookmaking machine, facsimile machine, multifunction machine, etc., which performs a print outputting function for any purpose.

The invention claimed is:

1. A printing system comprising:
a plurality of networked printing devices, each printing device of the plurality of printing devices comprising:
a communication port for operatively communicating with another printing device of the plurality of printing devices via a network, wherein each of the printing devices of the plurality of printing devices is assigned a respective network address for use when communicating via the network;
a first printing device of the plurality of printing devices comprising a first communication device having circuitry for being automatically sensed by a second printing device of the plurality of printing devices independently of the network; and
the second printing device comprising:
a second communication device having circuitry for automatically sensing the presence of the first communication device of the first printing device independently of the network, the second communication device being in physical proximity to the first communication device; and a processor for executing application software for determining the network address of the sensed first printing device via the network, for comparing an identifier corresponding to the first communication device to a stored list of identifiers, and for adding the identifier corresponding to the first communication device to the list if the stored identifier is not on the list, the processor further executing application software for resolving identifiers for establishment of at least one cluster with at least one other printing device of the plurality of networked printing devices;

wherein the establishment of the at least one cluster is (i) dynamic and spontaneous, (ii) based on one or more attributes selected by a user, the at least one cluster having a unique name associated therewith, and (iii) independent of an order in which each printing device of the plurality of printing devices joined the at least one cluster; and wherein each printing device of the plurality of printing devices is permitted to join or remove itself from the at least one cluster at any time without affecting the other printing devices that have previously joined the at least one cluster.

2. The printing system in accordance with claim 1, wherein:
the first communication device further includes circuitry for storing a hardware identifier which is associated with the first printing device; and
the circuitry for sensing of the second communication device further retrieves the hardware identifier stored by the first communication device of the first printing device.

3. The printing system in accordance with claim 2, wherein the processor of the second printing device executing the application software for determining the network address of the first printing device correlates the retrieved hardware identifier with the network address of the first printing device.

4. The printing system in accordance with claim 2, wherein the processor of the second printing device executing the application software for determining the network address of the first printing device further generates a query message for transmission via the network to the plurality of printing devices, the query message including the retrieved hardware identifier and requesting the network address of the printing device having an associated hardware identifier which substantially matches the hardware identifier included in the query message.

5. The printing system in accordance with claim 4, wherein the processor of the second printing device executing the application software for determining transmits the query message via at least one of a multicast and a broadcast.

6. The printing system in accordance with claim 4, wherein the first printing device comprises a processor executing software application for generating a reply message responsive to the query message for transmission via the network, wherein the reply message includes the network address of the first printing device.

7. The printing system in accordance with claim 4, wherein each printing device of the plurality of printing devices having a first communication device further comprises:
a storage device for storing the hardware identifier that is stored by the first communication device of the printing device; and
a processor in operative communication with the storage device, wherein the processor executes application software for determining if the hardware identifier included in a received query message substantially matches the hardware identifier stored by its associated storage device, and upon a positive determination generates a reply message responsive to the received query message for transmission via the network, wherein the reply message includes the network address of the printing device transmitting the reply message.

8. The printing system in accordance with claim 1, wherein the first and second communication devices are radio frequency identification (RFID) devices, and the sensing is performed using RFID technology.

9. The printing system in accordance with claim 2, wherein the circuitry for sensing of the second communication device includes an RFID reader device for performing RFID interrogations; the circuitry for being sensed of the first communication device includes an RFID tag for storing the hardware identifier and transmitting the hardware identifier when being interrogated, and the hardware identifier is an RFID identifier.

10. The printing system in accordance with claim 1, wherein:
the processor requests a cluster name and compares the cluster name received via the request to a stored cluster name.

11. The printing system in accordance with claim 10, wherein:
the processor selects either the cluster name or the stored cluster name based on which cluster name has the lower value.

12. A method for communicating via a network between devices of a plurality of networked devices each device assigned a respective network address, the method comprising a first device of the plurality of devices:
automatically sensing the presence of another device of the plurality of devices independently of the network;
determining via the network the network address of the automatically sensed device;
communicating with the automatically sensed device via the network using the network address, the plurality of devices being in physical proximity to each other;
interrogating the automatically sensed device and comparing an identifier corresponding to the sensed device to a stored list of identifiers and adding the identifier corresponding to the sensed device to the stored list if said identifier is not on the list; and
resolving identifiers for establishment of at least one cluster with at least one other device of the plurality of networked devices;
wherein the establishment of the at least one cluster is (i) dynamic and spontaneous, (ii) based on one or more attributes selected by a user, the at least one cluster having a unique name associated therewith, and (iii) independent of an order in which each printing device of the plurality of networked devices joined the at least one cluster; and
wherein each printing device of the plurality of networked devices is permitted to join or remove itself from the at least one cluster at any time without affecting the other printing devices that have previously joined the at least one cluster.

13. The method according to claim 12, wherein:
each device of the plurality of devices has an associated hardware identifier; and
the sensing includes retrieving the hardware identifier associated with the device being sensed.

14. The method according to claim 13, wherein the determining the network address of the sensed device includes correlating the retrieved hardware identifier with the network address of the sensed device.

15. The method according to claim 13, wherein the step of determining the network address of the sensed device includes transmitting a query message via the network to the plurality of devices requesting the network address of the device that has an associated hardware identifier that substantially matches the retrieved hardware identifier.

16. The method according to claim 15, wherein the step of transmitting the query message includes transmitting the query message via at least one of a multicast and a broadcast.

17. The method according to claim 15, wherein the step of determining the network address of the sensed device further comprises the sensed device replying to the query message via the network including sending a reply message including the network address of the sensed device.

18. The method according to claim 15, wherein the method further comprises each of the devices of the plurality of devices that receive the query message:
   determining if the hardware identifier included in the query message substantially matches its associated hardware identifier; and
   replying to the query message upon a positive determination by transmitting a reply message via the network that includes the network address of the device transmitting the reply message.

19. The method according to claim 12, the method further comprises:
   providing each device of the plurality of devices with a radio frequency identification (RFID) device storing its associated hardware identifier, wherein the associated hardware identifier is a unique RFID identifier; and
   wherein the step of sensing further comprises retrieving the RFID identifier stored by the RFID device of the device being sensed using RFID technology.

20. The method according to claim 12, wherein the devices of the plurality of devices are printing devices.

21. The method in accordance with claim 12, further comprising requesting a cluster name and comparing the cluster name received to a stored cluster name.

22. The method in accordance with claim 21, further comprising selecting either the cluster name or the stored cluster name based on which cluster name has the lower value.

23. A processor associated with a first device of a plurality of networked devices comprising:
   a software application module for automatically receiving a hardware identifier associated with a second device of the plurality of networked devices which was retrieved from the second device independently of the network;
   a software application module for comparing the hardware identifier corresponding to the second device to a stored list of identifiers and for adding the hardware identifier corresponding to the second device to the list if said hardware identifier is not on the list;
   a software application module for communicating via the network with the plurality of networked devices for determining a network address for the second device, the plurality of devices being in physical proximity to each other; and
   a software application module for resolving identifiers for establishment of at least one cluster with at least one other device of the plurality of networked devices;
   wherein the establishment of the at least one cluster is (i) dynamic and spontaneous, (ii) based on one or more attributes selected by a user, the at least one cluster having a unique name associated therewith, and (iii) independent of an order in which each printing device of the plurality of networked devices joined the at least one cluster; and
   wherein each printing device of the plurality of networked devices is permitted to join or remove itself from the at least one cluster at any time without affecting the other printing devices that have previously joined the at least one cluster.

24. The processor according to claim 23, wherein each of the networked devices has an associated hardware identifier operable for retrieval independently of the network, the processor further comprising:
   an application software module for transmitting a query message via the network to the plurality of networked devices requesting the network address of the networked device that has an associated hardware identifier that substantially matches the hardware identifier received by the application software module for receiving.

25. The processor in accordance with claim 23, further comprising:
   a software application module for requesting a cluster name and comparing the cluster name to a stored cluster name, and selecting either the cluster name or the stored cluster name based on which cluster name has the lower value.

* * * * *